SAMUEL PELTON.
Improvement in Horse Powers.
No. 123,416.
Patented Feb. 6, 1872.
2 Sheets--Sheet 1.
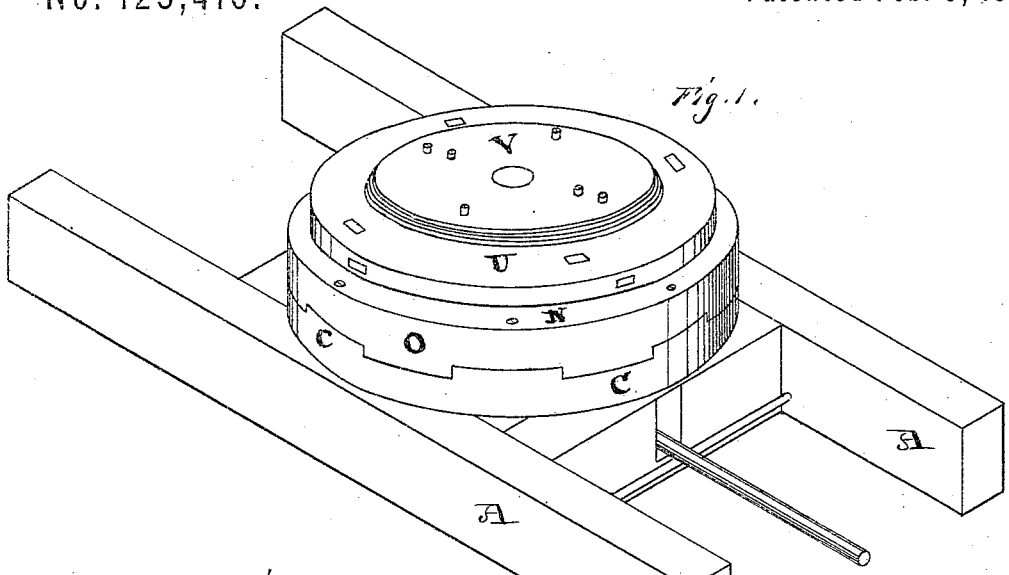
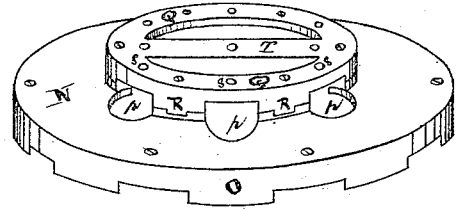
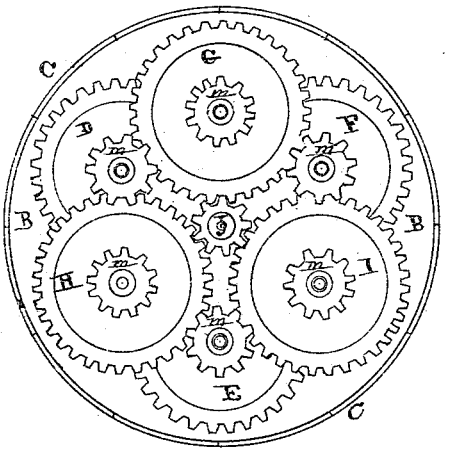
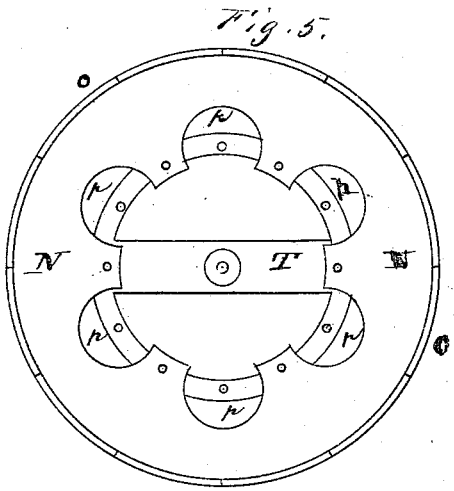
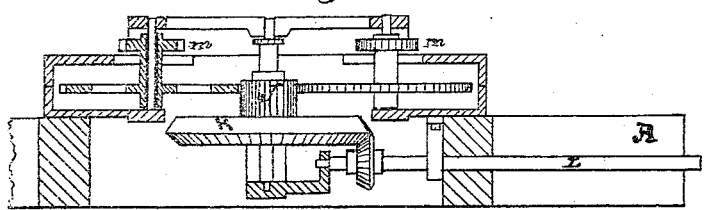
Witnesses
John L. Borne
W. F. Brisham
Inventor
Samuel Pelton
by Dewey & Co
his Attorneys SAMUEL PELTON.
No. 123,416.
2 Sheets--Sheet 2
Improvement in Horse Powers.
Patented Feb. 6, 1872.
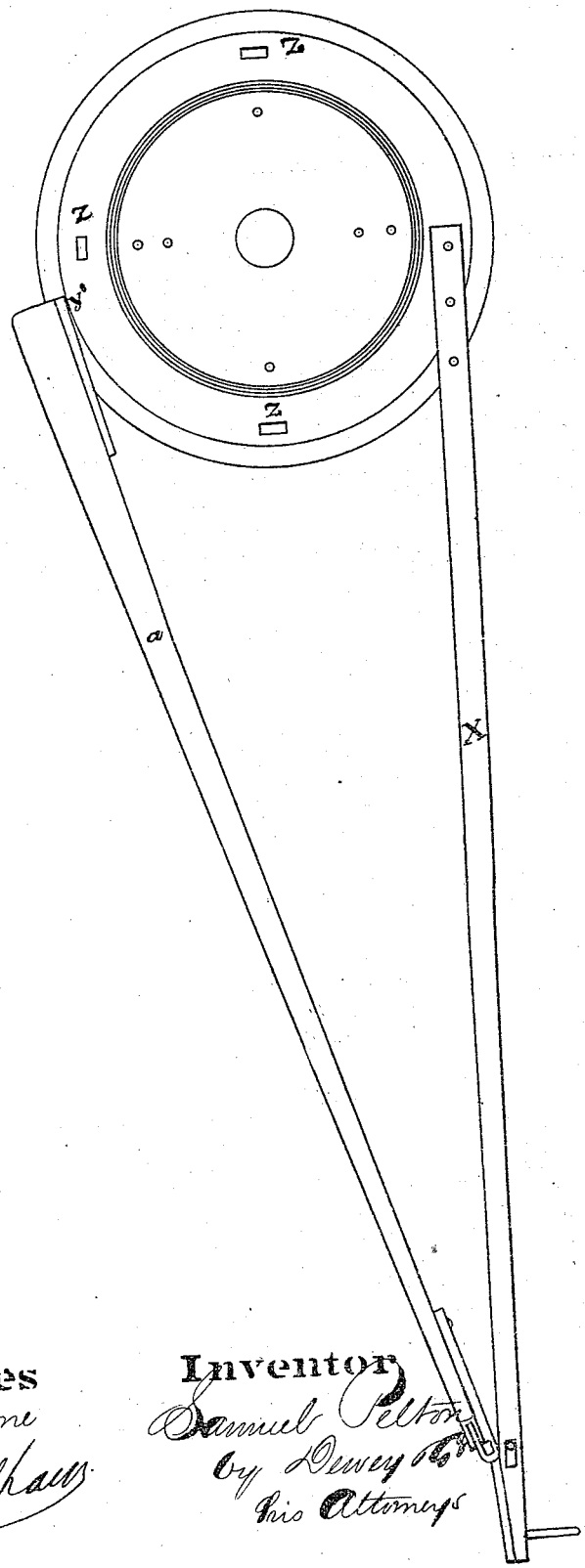
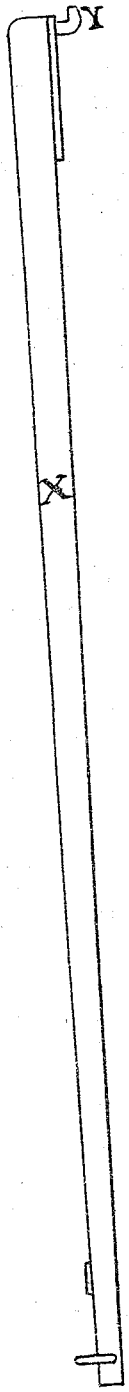

123,416

UNITED STATES PATENT OFFICE.

SAMUEL PELTON, OF MARYSVILLE, CALIFORNIA.

IMPROVEMENT IN HORSE-POWERS.

Specification forming part of Letters Patent No. 123,416, dated February 6, 1872.

SPECIFICATION.

*To all whom it may concern:*

Be it known that I, SAMUEL PELTON, of Marysville, Yuba county, State of California, have invented an Improved Horse-Power; and I do hereby declare the following description and accompanying drawing are sufficient to enable any person skilled in the art or science to which it most nearly appertains to make and use my said invention or improvements without further invention or experiment.

My invention relates to improvements in the construction of horse-powers whereby I secure strength, compactness, a large wearing-surface, and, consequently, durability and freedom from dirt. The horse-power to which I have added my improvements is what is known as the triple-gear horse-power; and my improvements consist, first, in the employment of two sets of triple-gears, one arranged above the other, both of them driven by the same master-wheel; secondly, in a case or boxing of novel construction and application, by which the gearing or moving parts of the power is protected from dirt and from injury by external causes; and lastly, in an improved attachment of the draft-beam and brace to the master-wheel of the power.

In order to describe my invention so that others will be able to understand and practice the same, reference is had to the accompanying drawing forming a part of this specification, in which—

Figure 1, Sheet 1, is a perspective view. Fig. 2, Sheet 1, is a view of the master-wheel, bottom up. Fig. 3, Sheet 1, is a perspective view of the upper part of the frame. Fig. 4, Sheet 1, is a plan of the lower part of the frame with the wheels in place. Fig. 5, Sheet 1, is a bottom view of the part shown at Fig. 3. Fig. 6, Sheet 1, is a transverse section of the machine, showing only two of the upper sets of wheels in place. Fig. 7, Sheet 2, is a plan, showing the draft-levers. Fig. 8, Sheet 2, is a view of one of the draft-levers.

The same letters indicate identical parts wherever they occur in each of the figures.

A represents the bed-frame upon which the horse-power is secured. The annular metal disk B is properly secured upon the frame A, and has a raised outer rim or vertical flange, C, which is formed into alternate raises and depressions in the manner and for the purpose to be hereafter more fully described, thus forming the lower half or section of a circular box. The double set of triple-gear is arranged inside of this section of the box in the manner shown at Fig. 4—that is, D E F represent the lower set of triple-gears, while G H I represent the upper set—the two sets being arranged in alternation, and each of the six toothed wheels engaging with the center pinion J, which is made with a sufficient face to admit the engagement of both sets of triple-gears. The horizontal bevel-wheel K is driven by the center pinion J, being secured to the lower end of the same shaft, and it in turn drives the tumbling-rod L. At the upper end of each of the shafts which carry the wheels D E F G H I is a pinion, $m$, shown at Fig. 4. N, Fig. 3, is the upper half of the circular box or case, inside of which the train of gears is placed, and it is arranged with a downward-projecting flange, O, which is also provided with alternate raises and depressions corresponding to the raises and depressions on the flange C of the lower half, so that when the two flanges are placed together the projections will interlock and form a snugly-fitting side of the case, so as to resist the torsion consequent on the application of the power. The upper section of the box N is also annular, and recesses $p$ are made in the proper position around its inner edge, as shown at Fig. 5, through which the pinions pass, so as to stand above the upper face of the upper section. A raised ring, Q, shown at Fig. 3, is secured around the edge and above the circular opening in the upper section N, being secured to it by flanges R, which project downward so as to leave sufficient space above the recesses $p$ to allow the pinions $m$ to project above the case or box. The journals on the upper end of the vertical shafts which carry the double set of triple-gears bear and are supported in the holes S in this ring, while the journal of the shaft which carries the center pinion J bears in the cross-bar T. The shafts and their bearings are arranged in the same manner and upon the same principle as shown and explained in Letters Patent for a triple-gear horse-power which was granted to me on the 18th day of December, 1855. The master-wheel U is a simple ring, provided with internal gears which fit down over the raised ring Q and rest upon the upper face of the section N. This wheel engages with each of the pinions m, through which the double set of triple-gears is driven. To render this wheel as light as possible, and yet be sufficiently strong, I channel out the under side of the ring, as shown at Fig. 2, so as to leave two parallel flanges, W W, upon the inner one of which the teeth are formed. In order to protect the gearing inside of the box a cap or cover, V, Fig. 1, is secured upon the raised ring Q, thus entirely concealing the operating parts, and preventing the master-wheel from being lifted or displaced by any means. The four levers, X, to which the horses are attached, are secured to the master-wheel U by means of a hook or curved bar, y, which is secured to the end of each lever, so that the hook shall extend slightly beyond the end and in a line with the lever. Holes or slots Z are made through the upper face of the master-wheel, parallel with its rim and the hooks y, inserted by elevating the outer end of the lever until the end of the hook enters the slot. The lever, when depressed, will then be supported upon the master-wheel by the hook binding upon the under side of the master-wheel. The braces a are provided at one end with a similar hook, y', which is inserted into slots Z' in the rim or outer flange of the master-wheel in the same manner as described for the levers. The outer extremity of the braces a are secured to the levers X, near their outer ends, by a loose joint, shown at b.

By this manner of arranging and applying the triple-gears I secure a large amount of wearing surface, and distribute the strain more evenly, thus obtaining durability and strength, while the entire machine is at the same time in a compact and convenient form.

The arrangement of the box or inclosing-case is at once economical and convenient. While it not only protects the gearing itself from injury, it completely obviates any liability of accident to life or limb, which the ordinary open horse-power is liable to occasion. It also excludes dust and dirt from the machinery, so that it will not be necessary to be continually cleaning the journals from the accumulation of gummy or other accumulated matter, thus saving oil and much time while the machine will run much easier on account of its keeping clean.

My device for attaching the levers and braces is especially useful, as it will allow of all necessary changes in the elevation of the outer extremities of the levers, without in any way affecting the attachment, while it at the same time provides a simple, strong, and convenient means of attaching these pieces to the horse-power.

Having thus described my invention, what I claim, and desire to secure by Letters Patent, is—

1. A horse-power composed of the double set of triple-gear, consisting of the wheels D E F G H I with their pinions m, in combination with the center pinion J and master-wheel U, substantially as above described.

2. The inclosing-box, consisting of the upper and lower sections B and N, united as described, raised ring Q, either with or without cap or cover V, substantially as and for the purpose above specified.

3. The levers X and braces a, provided with the hook or curved bars y y', in combination with the slots Z Z' in the master-wheel, substantially as and for the purpose above specified.

In witness whereof I hereunto set my hand and seal.

SAMUEL PELTON. [L. S.]

Witnesses:
W. F. BINGHAM,
GEO. B. TAYLOR.